United States Patent [19]

Ackermann et al.

[11] Patent Number: 5,078,241
[45] Date of Patent: Jan. 7, 1992

[54] CONTROLLABLE VIBRATION DAMPERS FOR MOTOR VEHICLES

[75] Inventors: Norbert Ackermann, Eitorf; Hurbert Beck, Eitorf-Keuenhof, both of Fed. Rep. of Germany

[73] Assignee: BOGE Aktiengesellschaft, Eitorf, Fed. Rep. of Germany

[21] Appl. No.: 506,332

[22] Filed: Apr. 9, 1990

[30] Foreign Application Priority Data

Apr. 29, 1989 [DE] Fed. Rep. of Germany ....... 3914297

[51] Int. Cl.$^5$ ............................................. B60G 17/08
[52] U.S. Cl. .................... 188/299; 188/282; 188/322.15
[58] Field of Search ............... 188/285, 299, 281, 282, 188/278, 317, 319, 280, 322.13, 322.15

[56] References Cited

U.S. PATENT DOCUMENTS

| | | | |
|---|---|---|---|
| 3,256,960 | 6/1966 | Casimir | 188/299 |
| 3,312,312 | 4/1967 | Bourcier De Carbon | 188/88 |
| 3,837,445 | 9/1974 | Pierle | 188/282 X |
| 4,535,877 | 8/1985 | Shimokura | 188/299 |
| 4,570,095 | 2/1986 | Uchikawa | 310/328 |
| 4,577,840 | 3/1986 | Meller et al. | 267/64.17 |
| 4,729,459 | 3/1988 | Inasaki et al. | 188/299 |
| 4,802,561 | 2/1989 | Knecht et al. | 188/318 |
| 4,834,222 | 5/1989 | Kato et al. | 188/322.15 X |
| 4,874,980 | 10/1989 | Mine et al. | 310/328 |
| 4,880,086 | 11/1989 | Knecht et al. | 188/299 |

FOREIGN PATENT DOCUMENTS 1505478 9/1969 Fed. Rep. of Germany .
3719113 8/1988 Fed. Rep. of Germany .

Primary Examiner—Matthew C. Graham
Attorney, Agent, or Firm—Nils H. Ljungman & Associates

[57] ABSTRACT

Controllable vibration dampers for motor vehicles that include a cylinder which contains a damping medium and an axially movable piston rod sealed and submerged in the medium. A damping piston is attached to the piston rod and subdivides the cylinder into a two work chambers. A hollow piston is provided with at least one valve disc which is movable within the piston. The disc moves into and out of engagement with ledge or edge structures provided within the piston when a dampening medium is directed against and past the disc.

17 Claims, 10 Drawing Sheets

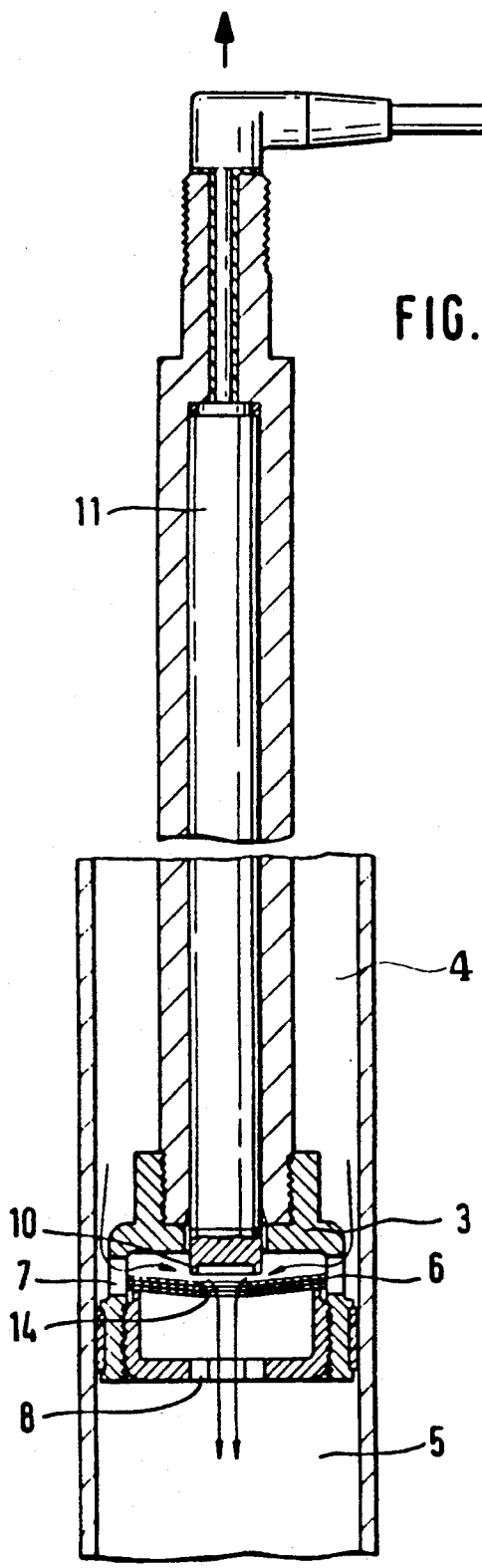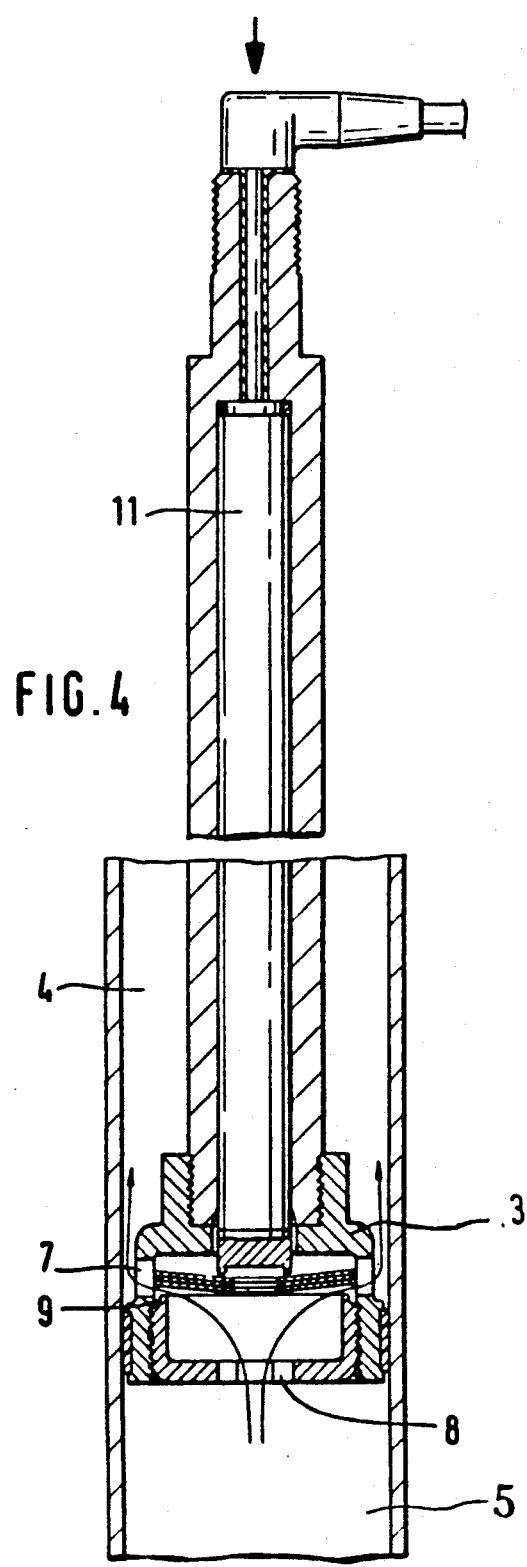

CONTROLLABLE VIBRATION DAMPERS FOR MOTOR VEHICLES

BACKGROUND OF THE INVENTION

1. Field of the Invention

The invention relates to controllable vibration dampers for motor vehicles, The damper includes a cylinder which contains a damping medium and an axially movable piston rod sealed and submerged in the medium A damping piston is attached to the piston rod and subdivides the cylinder into a two work chambers. The damping piston has passages which are controlled by valve discs. The valve discs have their outer diameter of one face resting on a leading edge of and on their opposite face side their inner circumference is supported with a second leading edge.

2. Background Information

Hydraulic vibration dampers are already known. For example U.S. Pat. No. 3,312,312 shows a damping piston design in which valve discs having their outer dimensions resting on an outer edge or ledge in the piston on the opposite face or side of the discs the inner circumferences are supported by a second ledge or edge. Passages in the damping piston are controlled by the valve discs, and provide tension and pressure modes of operation of the damping process. Control for a change of the dampening force at the valve discs is not provided in this vibration damper.

Beyond this, controllable vibration dampers are known, for example German Patent No. 37 19 113, which corresponds to U.S. Pat. No. 4,880,086, entitled "Adjustable Vibration Damper", where an infinitely variable damping valve is contemplated. Since such a damping valve can only be subject to flow from one side, the utilization of this damping valve is primarily limited to a bypass system in a two-tube type of vibration damper. The application of this damping valve in a gas pressure damper or in a spring cylinder does not require a reworking of the vibration damper itself whereby corresponding check valves must permit the one-sided flow into the damping valve.

OBJECT OF THE INVENTION

It is, therefore, the object of the invention to provide a hydraulic vibration damper with a quickly shiftable dampening valve which can be adjusted in an infinitely variable manner. The damper should be simply constructed. Further, the damper should exhibit passive damping force characteristic curves with a linear tube digressive characteristic. Such a damper, may be useful in a twin-tube damper, a single-tube damper, gas pressure vibration dampers, and/or in a spring cylinder.

SUMMARY OF THE INVENTION

As a solution to the task at hand, in accordance with the invention, a hollow piston is provided with at least one valve disc. The disc is movable within the piston. It moves into and out of engagement with ledge or edge structures provided within the piston when a dampening medium is directed against and past the disc. When the medium flows in a "pressure" direction and mode it moves the disc against a ledge in the piston the engages the center of the disc and past the outer periphery of the disc. In a "tension" mode, the flow is through a center opening of the disc, which flow moves the periphery of the disc against a second ledge of the piston.

The disc within the piston constitutes a valve that controls the flow of the medium through the piston, and controls the amount of damping provided by the overall damper. This control is made adjustable by an adjustment means that extends into a cylinder housing the piston and damping medium. The adjustment means includes one of the ledges that engages the disc, said adjustment means and ledge being effective to bias the disc in one direction of disc movement. It is advantageous to use an adjustable component with a changeable length, such as, piezo-mechanical means, for example.

The advantage of this solution is that a damping valve and a damping piston are operative in both directions of the flow of the damping medium through the valve, such as a, disc and the piston. The adjustable valve of the invention can further be utilized in a two tube vibration damper, gas pressure, as well as single tube vibration dampers, and spring cylinders.

In an especially advantageous embodiment it is planned that two or more valve discs are used and are pretensioned by a spring element such that the direction of medium flow through the valve during the engagement of this pretension is reduced. With this, a damping force characteristic curve can be influenced accordingly in an advantageous way.

In another embodiment of the invention, the valve discs contain recesses whereby in the tension and/or pressure direction of medium flow through the valve discs, the recesses are located towards a high pressure side in the area of the ledge engaging the discs, with at least one recess being covered by respective discs on the lower pressure side.

According to an important characteristic, the valve discs that are located away from a ledge become effective in a tension mode on a lower pressure side of the discs and are supported by an additional spring element. The valve discs facing the ledge become effective in the pressure mode and are located on the low pressure side, are supported by an additional spring element.

As an advantageous embodiment from the viewpoint of a fine adjustment technique, it is desirable that the valve discs be spring discs of different inner diameters, and be supported on a ledge by their common outer diameter. Or, the valve discs can have different outer diameters and are supported by a ledge at their common inner diameters.

One aspect of the invention resides broadly in an adjustable vibration damper for motor vehicles or the like, the comprising: first and second device for attaching the damper to a motor vehicle or the like; a cylinder which contains a damping medium an axially movable piston rod located in the cylinder and a dampening medium contain in the cylinder a damping piston attached to the piston rod, which damping piston subdivides the cylinder into two work chambers; passages provided in the piston for permitting the flow of the damping medium through the piston; at least one valve disc movable within the piston: first device within the piston for engaging an outer portion of the disc in one direction of piston movement; second means within the piston for engaging an inner portion of the disc in the opposite direction of piston movement; and adjustment device axially movable within the cylinder for biasing the at least one disc in at least one direction.

In summary, one feature of the invention resides broadly in a controllable vibration damper for motor vehicles. The damper includes a cylinder which contains a damping medium and an axially movable piston rod sealed and submerged in the medium. A damping piston is attached to the rod and subdivides the cylinder into two working chambers. The damping piston has passages which are controlled by valve discs, whereby the valve discs with their outer diameters, rest on a first ledge. On their opposite face or side, their inner circumference is supported by a second ledge. At least one ledge is connected with the other ledge by means of an adjustment device which is axially movable within the cylinder.

Another feature of the invention resides broadly in a vibration damper which is characterized by the fact that one ledge is a component of the adjustment device.

Yet another feature of the invention resides broadly in a vibration damper which is characterized by the fact that the adjustment device consists of a component with adjustable lengths.

A further feature of the invention resides broadly in a vibration damper which is characterized by the fact that the adjustment device consists of a piezo-mechanical component which is adjustable in length.

A yet further feature of the invention resides broadly in a vibration damper which is characterized by the fact that the valve discs are retained by the pretensioning of a spring element, and that the adjustment device, if operated, reduces this pretension.

Yet another feature of the invention resides broadly in a vibration damper which is characterized by the fact that the valve discs contain recesses. The recesses can be located on either the pressure or tension side of the discs and in the area of a supporting ledge. At least one recess is preferably covered by a valve disc located on the low pressure side of the discs.

An additional feature of the invention resides broadly in a vibration damper which is characterized by the fact that the valve discs are supported by an additional spring element on the low pressure side, and against a ledge which becomes operative in the tension mode.

A yet additional feature of the invention resides broadly in a vibration damper which is characterized by the fact that the valve discs are supported by an additional spring element on the low pressure side and against a ledge which becomes operative in the pressure mode.

A further additional feature of the invention resides broadly in a vibration damper which is characterized by the fact that the valve discs are spring washers having different inner diameters, and are supported by a common outer diameter of the discs.

A yet further additional feature of the invention resides broadly in a vibration damper which is characterized by the fact that the valve discs consists of spring washers having different outer diameters, and are supported by a common inner diameter.

BRIEF DESCRIPTION OF THE DRAWINGS

The preferred examples of the embodiment of the invention are schematically illustrated in the drawings. As illustrated:

FIGS. 3 and 4 show the flow for a damping medium through a hollow piston of the vibration damper, and operation of the damper in tension and pressure modes, respectively.

DESCRIPTION OF THE PREFERRED EMBODIMENTS

Figure 1:
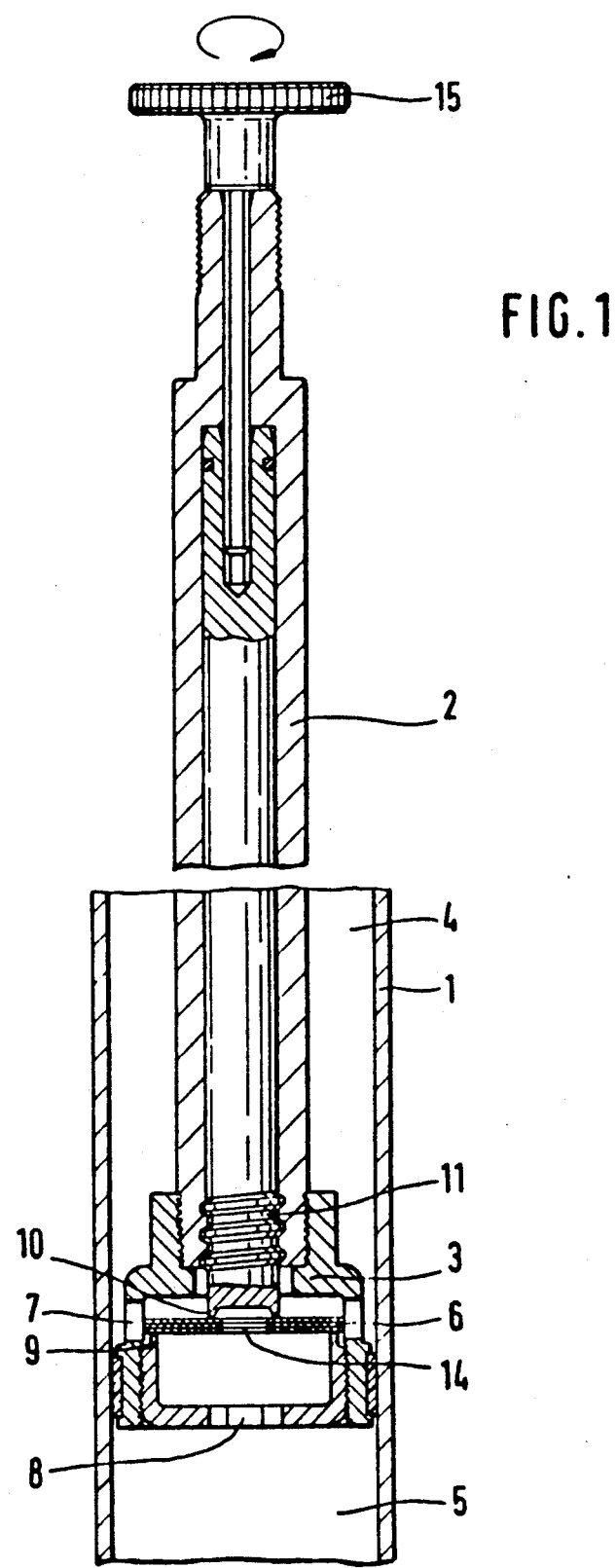
FIG. 1 is a vibration damper in cross section provided with a hand operated adjustment device.

The controllable vibration damper as shown in FIG. 1 comprises of a cylinder 1, a piston rod 2, which is axially moveably adjusted and submerged in a damping medium contained in cylinder 1, and a piston 3 attached to piston rod 2. The damping piston subdivides cylinder 1 into two work chambers 4 and 5. For the production of a dampening force, the damping piston is shown containing three valve discs 6 which are impacted by the damping medium when the medium passes through passages 7 and 8 in a tension mode.

In the pressure mode of the vibration damper, the damping medium moves from work chamber 5 through the passage 8 and past the outer circumference of the valve discs 6, then past passage 7 into the work chamber 4. Flow through an opening 14 in the center of the discs is prevented, as the discs are pressed against a solid edge 10 of a threaded adjustment means such as a shaft 11. In the tension mode, the damping medium moves in the opposite direction through passage 7, past the inner diameter of the valve discs 6 then through passage 14 and passage 8 into work chamber 5, as the flow through opening 7 moves the discs from edge 10, see FIG. 3. The valve discs 6 are supported by their outer diameter on a ledge 9 when their inner diameter is moved from the downwardly facing edge 10 of thread adjustment device 11. Pretensioning or biasing of valve discs 6 is provided by adjustment device 11, i.e. manual rotation of adjustment device 11 provides axial movement of edge 10 by a hand wheel 15 of device 11. Thus, the pretensioning of valve discs 6 is increased or decreased, respectively.

Figure 2:
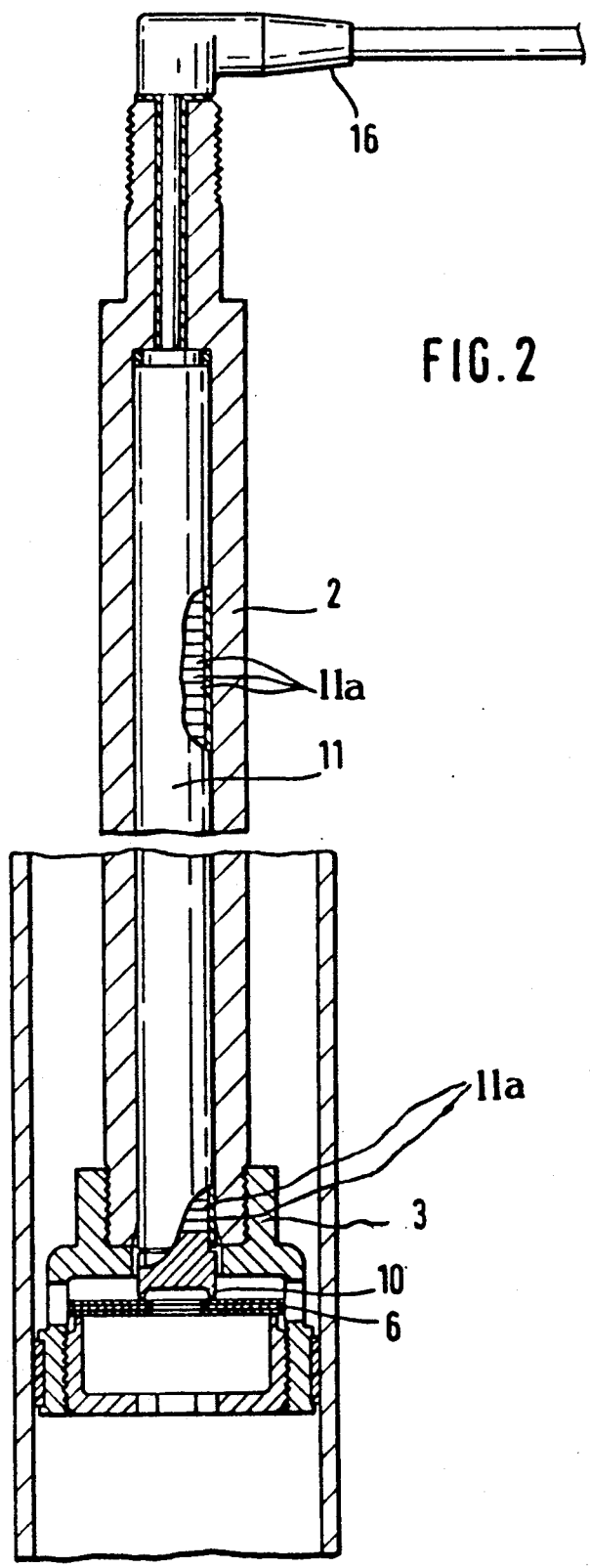
FIG. 2 is a further embodiment of a vibration damper provided with an adjustment device in the form of piezo-mechanical components.

A vibration damper, principally as illustrated in FIG. 1, is shown in FIG. 2, with the difference that edge 10 is in physical contact with changeable length components 11a of adjustment device 11. Length components 11a are located in an inner space of piston rod 2. Such components can, for example, be formulated from piezo-ceramic materials, where the length can be altered with the application of electrical energy by means of an electric connection 16. Valve discs 6 are thus, pretensioned by means of the changeable length components 11a.

In FIGS. 3 and 4, a vibration damper is illustrated in such a fashion that the direction of flow of a damping medium, as represented by arrows, is schematically illustrated. In FIG. 3, the flow is in a tension direction, while in FIG. 4, the flow is in a pressure direction. Further describing the tension direction of the damping medium as seen in FIG. 3, the damping medium exits from working chamber 4 through passage 7 of piston 3, then past the edge 10 into passage 14 of discs 6. From passage 14 the damping medium then proceeds through passage 8 of piston 3 into working chamber 5.

In FIG. 4, further describing the pressure direction of the vibration damper, the damping medium flows upwardly through passage 8 past ledge 9 of piston 3, through passage 7, and finally, into work chamber 4. The pressure required to move discs 6 from ledge 9 and edge 10 respectively, depending on the direction of pressure, will depend on the bias effected by the adjustment of device 11.

Figure 5:
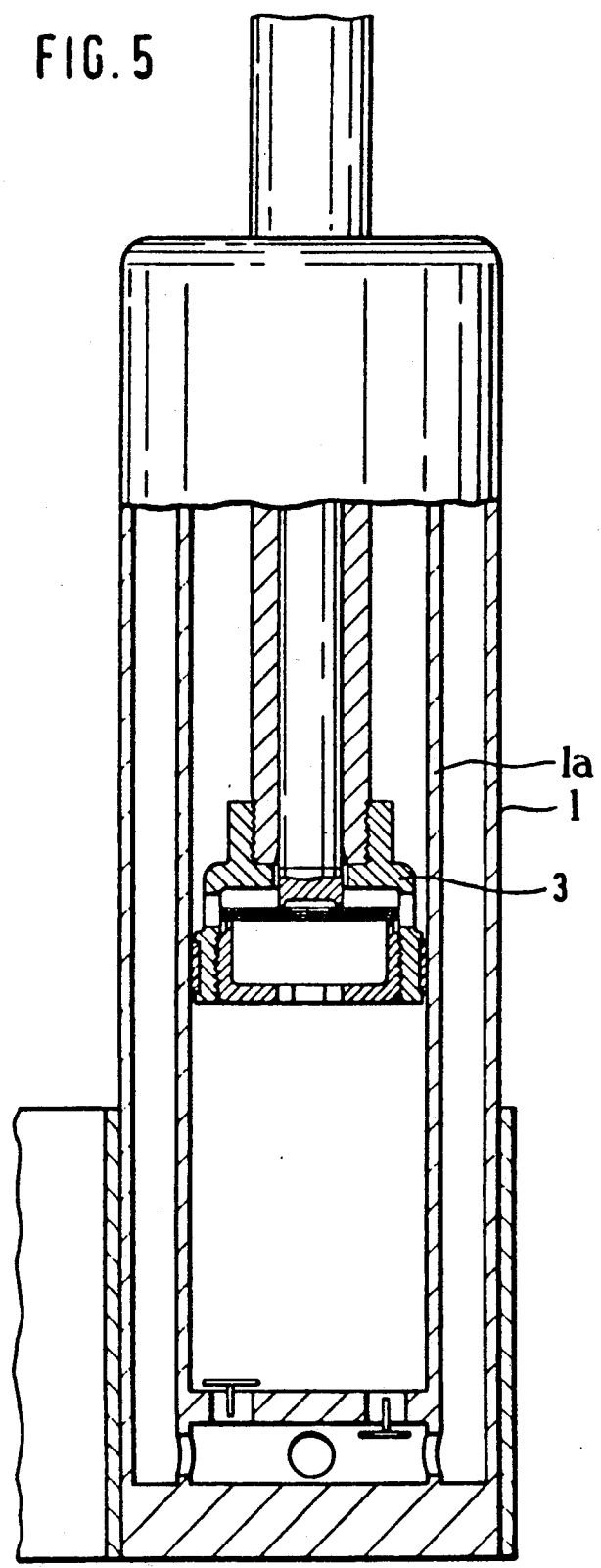
FIG. 5 is a twin tube vibration damper having a damping piston used as a shock absorbing strut.

FIG. 5 shows integration of one embodiment of the invention according to the twin-tube principle. FIG. 5 depicts a shock absorbing strut containing an inner tube 1a and an outer tube 1 using the embodiment of the invention according to FIG. 1 as outlined above. Twin-tubes are shown in U.S. Pat. No. 4,577,840, entitled "Self-Pumping Hydroneumatic Spring Leg or Strut with Internal Level Control for Motor Vehicles" and U.S. Pat. No. 4,802,561, entitled "A Vibration Damper for Motor Vehicles Having an Arrangement for Varying Damping Thereof" and also in U.S. patent application Ser. No. 07/349,004, filed May 9, 1989, entitled "Self-Pumping Hydropneumatic Shock Absorbing Leg with Internal Level Regulation".

Figure 6:
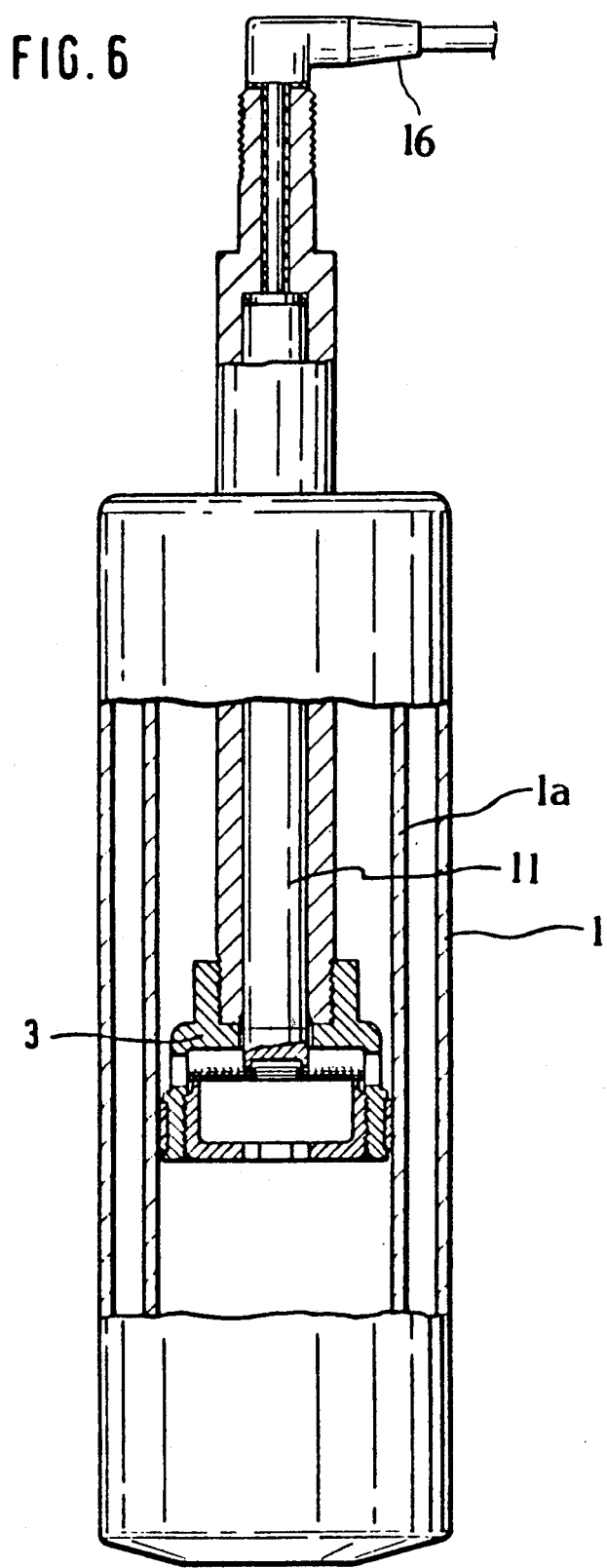
FIG. 6 shows a twin tube vibration damper as a shock absorbing strut cartridge.

FIG. 6 depicts a shock absorber strut cartridge containing an inner tube 1a and an outer tube 1 using the embodiment of the invention according to FIG. 2 as outlined above. The adjustment may be done piezo-electrically as described in U.S. Pat. No. 4,874,980, entitled "Laminated Mechanical Amplification Mechanism for Piezoelectric", and U.S. Pat. No. 4,570,095, entitled "Mechanical Amplification Mechanism Combined with Piezoelectric Elements".

Figure 7:
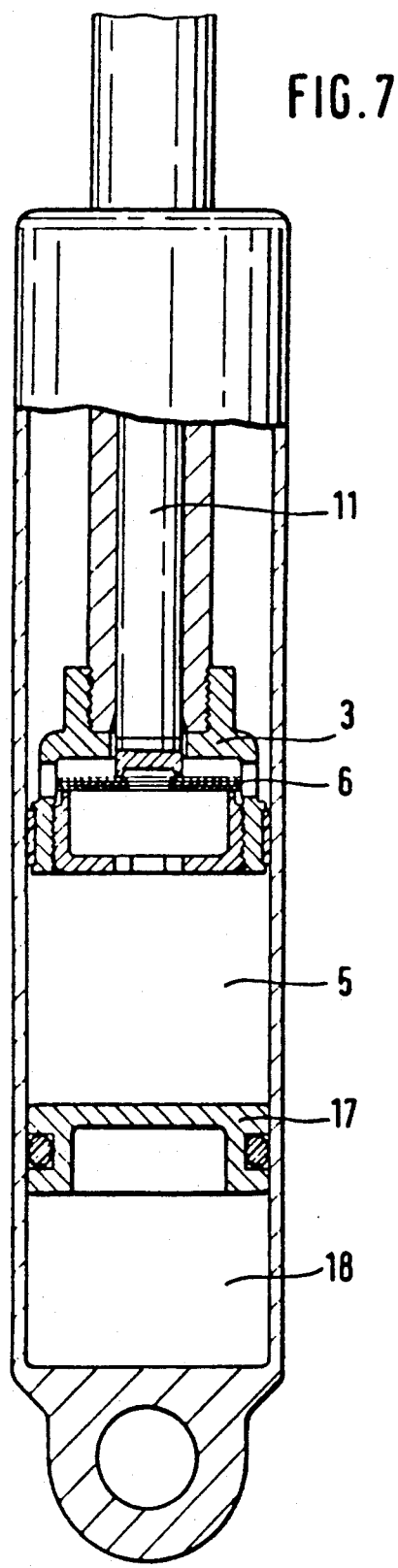
FIG. 7 shows a single tube gas pressure damper in cross section.

FIG. 7 shows damping piston 3 with valve discs 6 and an adjustment device 11 as an application of a single tube gas pressure damper. Here, the work chamber 5 is divided by piston 17. A gas cushion 18 is provided in a lower area of cylinder 1 beneath piston 17.

Figure 8:
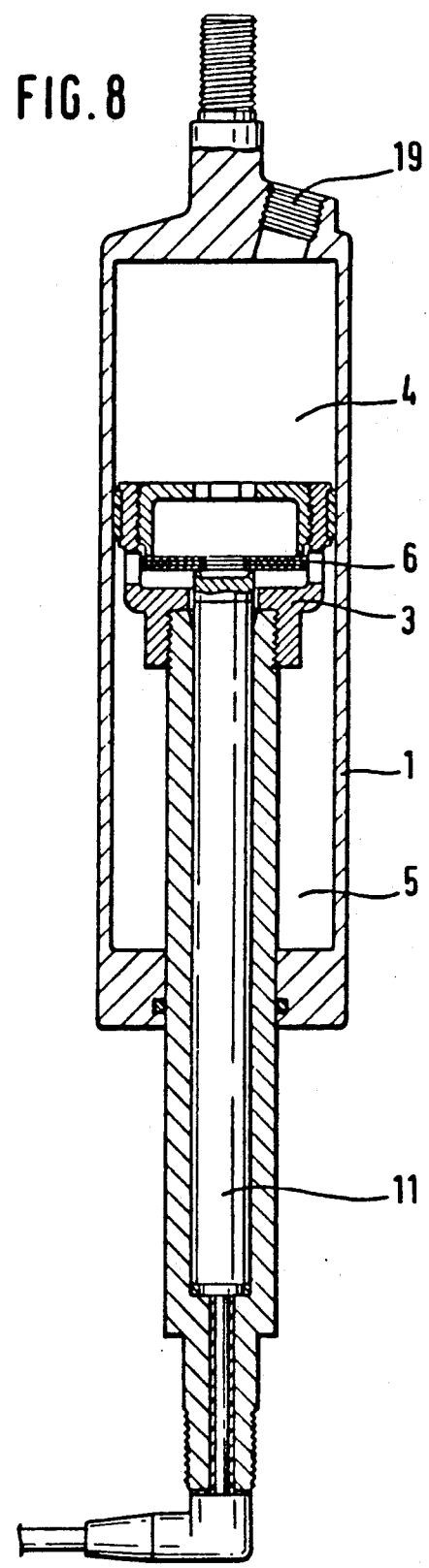
FIG. 8 shows a cylinder with a corresponding damping device wherein the cylinder is provided with means for using the cylinder as a leveling control device.

FIG. 8 shows a cylinder 1 whereby damping piston 3, again, subdivides cylinder 1 into working chambers 4 and 5, and where valve discs 6 can be pretensioned by means of adjustment device 11. Through a port 19, cylinder 1 can be connected to a pressure storage area, a heat equalization area, or other similar means located extraneous to the cylinder. Such extraneous means allow the cylinder to be used as a level regulating device, i.e., the amount of damping medium can be increased or decreased to adjust the level at which the cylinder will function.

Figure 9:
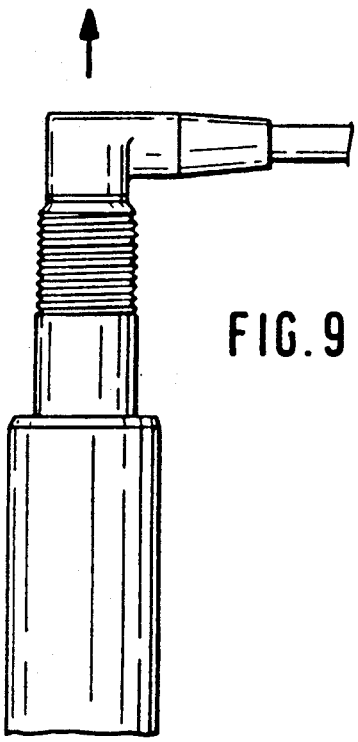
FIGS. 9 and 10 show an embodiment wherein the adjustment device is impacted by a coil spring element.
Figure 10:
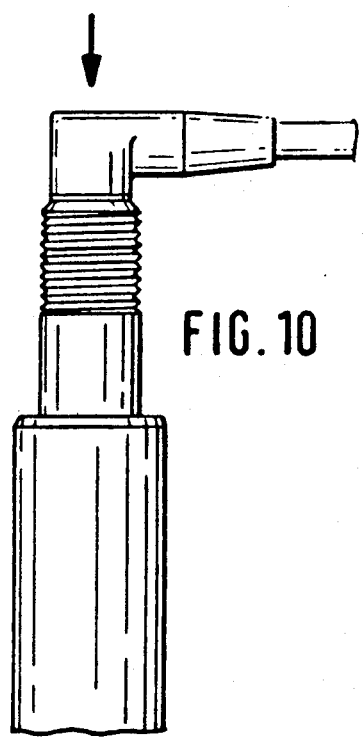

FIGS. 9 and 10 show a dampening piston 3 within a cylinder 1 whereby the adjustment device 11 works against spring element 12. The device 11 is equipped with a stud 20, which on its lower end has a component 21 which locates edge 10 beneath discs 6. Component 21 is threaded onto stud 20. If the adjustment device 11 is not provided with power, then, a substantial pretension is applied against valve discs 6 by spring element 12 pulling on stud 20 and thus on the axially movable component 21 and its edge 10. The consequence of this pulling action is that during a power failure the vibrating damper remains in a firm safety position. When electrical power becomes available to adjustment device 11 the device would then press against the spring element 12 and move stud 20, together with the component 21, to a lower position so that the tension on valve discs 6 would be released. This method of functioning applies both to tension and pressure conditions. In FIG. 9, the flow path of the damping medium is shown for the tension condition, whereas in FIG. 10, the flow path of the damping medium is shown, as schematically illustrated, in the pressure position. The principle, again, corresponds to the items shown in FIG. 1.

Figure 11:
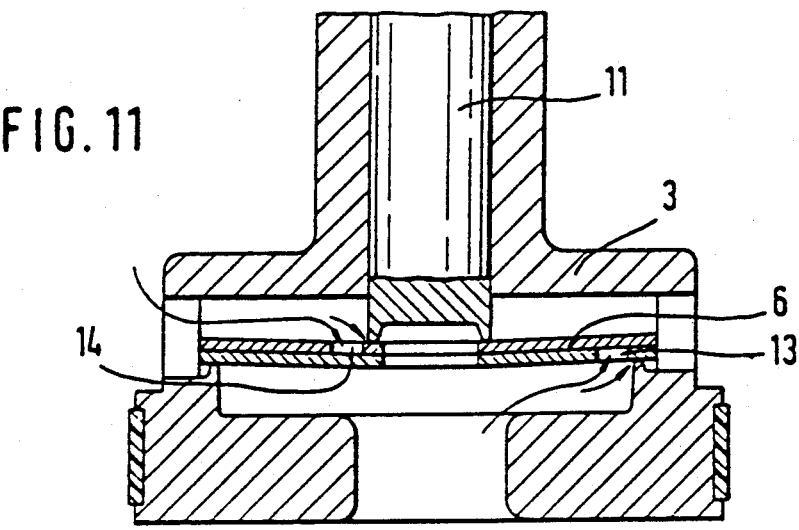
FIG. 11 is a damping piston as a unitary structure, with valve discs provided with an additional recess.

In FIG. 11, a dampening piston 3 is shown as a single integral component whereby the valve discs 6 are shown pretensioned through the adjustment device 11. Each valve disc is shown having a recess 13 or 14, respectively. The purpose of these recesses 13 and 14 is to provide limited partial volume flow and flow velocity of the damping medium through the discs either in the tension or pressure direction. With the lower velocity limit, when a lower damping force adjustment is made by means of adjustment device 11, makes a softer contact with valve discs 6. If adjustment device 11 is further pretensioned, the pretension in the respective covered valve discs will also increase, so that with an increased pretension provided by adjustment device 11, the influence of recesses 13,14 on the damping power force diminishes.

Figure 12A:
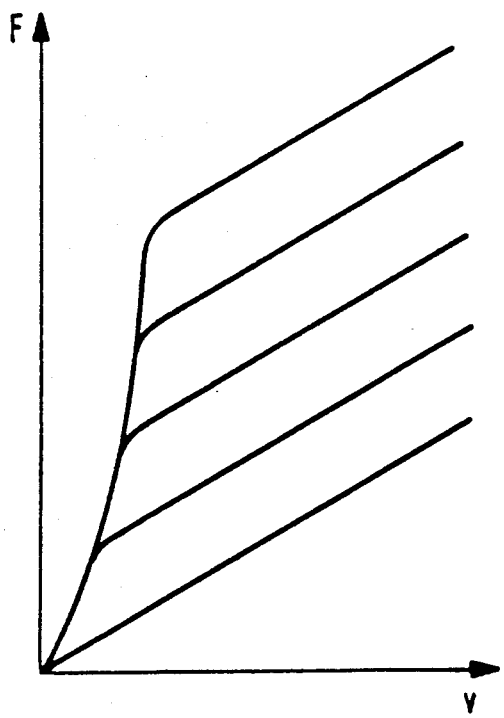
FIGS. 12a and 12b show damping force characteristic curves of two embodiments of the vibration damper according to the invention.
Figure 12B:
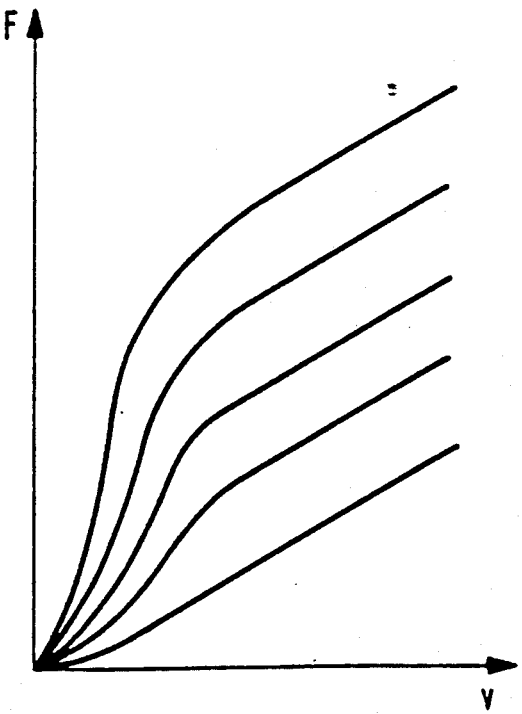

FIGS. 12a and 12b show, respectively, damping force characteristic curves (where force is plotted against damping medium velocity) fine adjustments (biases) of discs 6 for the vibration damper shown in FIG. 1 and for the damper of FIG. 11. Adjustments in the FIG. 1 damper affect force F and flow velocity V in a relatively straight line manner (FIG. 12a) whereas the flow of the medium through piston 3 in FIG. 11 is not as linear, as it is governed by one of the recesses 13,14 provided in discs 6. The recesses are utilized for a lower velocity limit. Thus, in FIG. 12a all damping force characteristic curves extend from a common flank (this comes from constant leakage or constant choke bore between the piston and cylinder in FIG. 1). In FIG. 12b, with a diminishing damping force adjustment, there is an increasingly softer damping force caused by the decreasing pretensioning provided by recesses 13 and 14.

Figure 13:
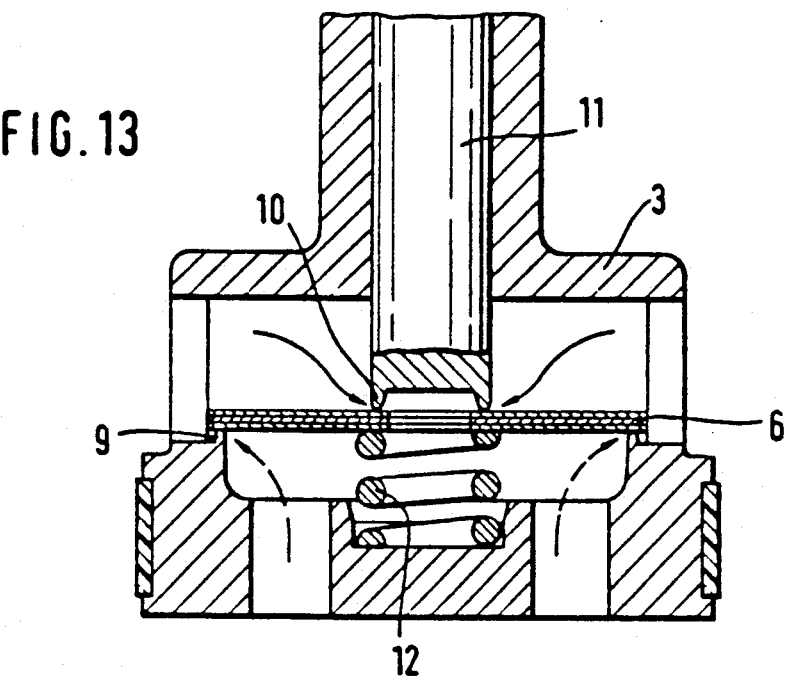
FIGS. 13 and 14 show a damping valve as a single component whereby in the tension mode and/or pressure mode additional spring elements are employed.
Figure 14:
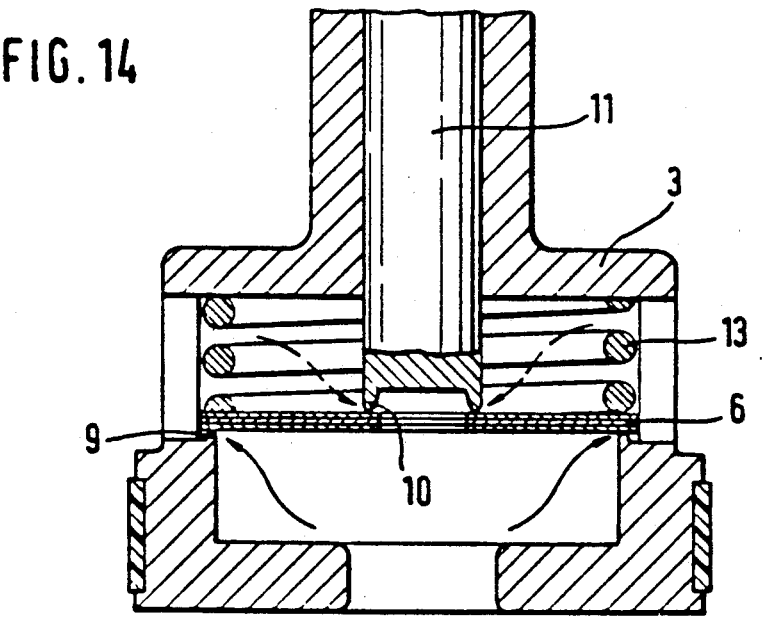

FIGS. 13 and 14 illustrate a further variation of a dampening piston 3, whereby a spring element 12 counteracts the force of adjustment device 11, and can become active only in the tension mode. Spring element 13 in FIG. 14 braces (biases) the valve discs 6 in a pressure mode. It is possible, with the help of spring element 12 and/or 13, to generate an equilibrium between the tension and pressure power flow that is independent of the geometric dimensions of the ledge 9 or 10 and the corresponding diameter of the valve discs 6.

Figure 15:
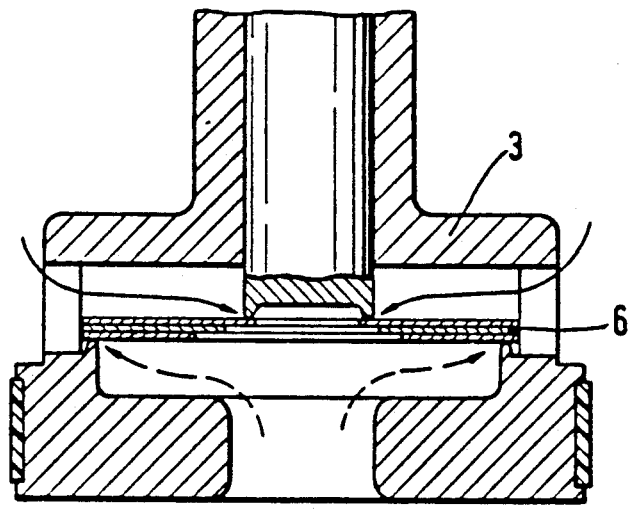
FIGS. 15 and 16 show damping valve as a single component, and valve discs with different inner and outer diameters.
Figure 16:
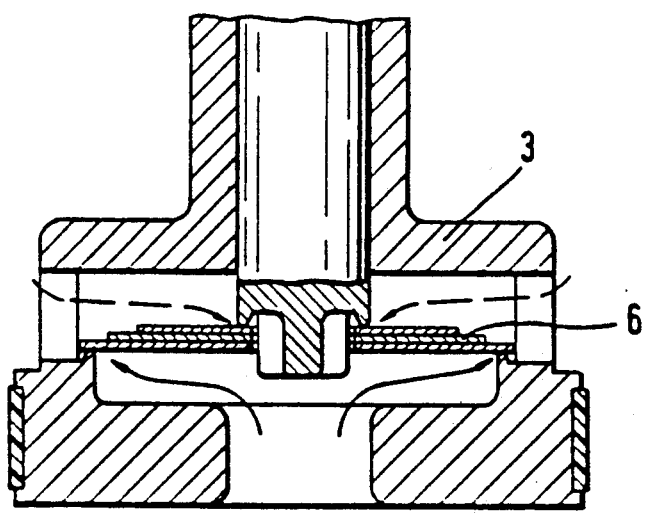

FIGS. 15 and 16 show further embodiments of the invention providing different damping force characteristic curves in the tension and/or pressure mode. The valve discs 6 of the dampening piston 3 consist of several individual spring discs, which are equipped with either a different inner diameter (FIG. 15) or with a different outer diameter (FIG. 16). If it is intended to have an increase of the dampening force in the tension mode, and if such is to operate under a mathematical relationship different from the pressure mode, this can be effected by use of spring washers as the valve discs 6, the washers having different diameters. The spring washers of the valve discs 6 can be guided in piston 3 by having a common outer diameter, while the inner diameter of the disc washer 6 can vary (FIG. 15). Or, the washers can be guided by an inner common diameter and stepped outer diameters, as shown in FIG. 16.

Controllable vibration dampers for motor vehicles are described above in which a cylinder contains a damping medium and an axially movable piston rod sealed and submerged in the medium, with a dampening piston attached to the piston rod. The dampening piston contains passages which are covered with valve discs. The valve discs are located with their outer circumference on an edge or ledge of the piston. On the opposite face or side of the discs, their inner circumference is supported by a second edge of the piston. For the purpose of adjustment of the damping force, at least one edge is adjustable in an axial manner.

In summary, one feature of the invention resides broadly in a controllable vibration damper for motor vehicles. The damper includes a cylinder which contains a damping medium and an axially movable piston rod sealed and submerged in the medium. A damping piston is attached to the rod and subdivides the cylinder into two working chambers. The damping piston has passages which are controlled by valve discs, whereby the valve discs with their outer diameters, rest on a first ledge (9,10). On their opposite face or side, their inner circumference is supported by a second ledge (9,10). At least one ledge (9,10) is connected with the other ledge (9,10) by means of an adjustment device which is axially movable within the cylinder.

Another feature of the invention resides broadly in a vibration damper which is characterized by the fact that one ledge (9,10) is a component of the adjustment device (11).

Yet another feature of the invention resides broadly in a vibration damper which is characterized by the fact that the adjustment device (11) consists of a component with adjustable lengths.

A further feature of the invention resides broadly in a vibration damper which is characterized by the fact that the adjustment device (11) consists of a piezo-mechanical component which is adjustable in length.

A yet further feature of the invention resides broadly in a vibration damper which is characterized by the fact that the valve discs (6) are retained by the pretensioning of a spring element (12), and that the adjustment device (11), if operated, reduces this pretension.

Yet another feature of the invention resides broadly in a vibration damper which is characterized by the fact that the valve discs (6) contain recesses (13,14). The recesses (13,14) can be located on either the pressure or tension side of the discs (6) and in the area of a supporting ledge (9,10). At least one recess (13,14) is preferably covered by a valve disc (6) located on the low pressure side of the discs (6).

An additional feature of the invention resides broadly in a vibration damper which is characterized by the fact that the valve discs (6) are supported by an additional spring element (12) on the low pressure side, and against a ledge (9,10) which becomes operative in the tension mode.

A yet additional feature of the invention resides broadly in a vibration damper which is characterized by the fact that the valve discs (6) are supported by an additional spring element (12) on the low pressure side and against a ledge (9,10) which becomes operative in the pressure mode.

A further additional feature of the invention resides broadly in a vibration damper which is characterized by the fact that the valve discs are spring washers having different inner diameters, and are supported by a common outer diameter of the discs.

A yet further additional feature of the invention resides broadly in a vibration damper which is characterized by the fact that the valve discs (6) consists of spring washers having different outer diameters, and are supported by a common inner diameter.

All, or substantially all, of the components and methods of the various embodiments may be used with at least one embodiment or all of the embodiments, if any, described herein.

All of the patents, patent applications, and publications recited herein, if any, are hereby incorporated by reference as if set forth in their entirety herein.

The details in the patents, patent applications, and publications may be considered to be incorporable, at applicant's option, into the claims during prosecution as further limitations in the claims to patentably distinguish any amended claims from any applied prior art.

The invention as described hereinabove in the context of the preferred embodiment is not to be taken as limited to all of the provided details thereof, since modifications and variations thereof may be made without departing from the spirit and scope of the invention.

We claim:

1. An adjustable vibration damper for motor vehicles, comprising:

first and second means for attaching said damper to a motor vehicle;

a cylinder which contains a damping medium;

an axially movable piston rod located in said cylinder;

a damping piston attached to said piston rod, which damping piston subdivides the cylinder into two work chambers;

passages provided in said piston for permitting the flow of the damping medium through the piston;

at least one valve disc movable within said piston;

first means, within said piston, for engaging an outer portion of the disc in one direction of piston movement;

second means, within said piston, for engaging an inner portion of the disc in the opposite direction of piston movement; and adjustment means axially movable within the cylinder and adjustable from outside the vibration damper for biasing said at least one disc in at least one direction, said adjustment means directly contacting said second means within said piston for engaging an inner portion of the disc.

2. The vibration damper according to claim 1 in which said adjustment means comprises a piezo-mechanical component that is adjustable in length.

3. The vibration damper according to claim 1 in which said adjustment means comprises at least one component having an adjustable length.

4. The vibration damper according to claim 3 in which said adjustment means comprises a piezo-mechanical component that is adjustable in length.

5. The vibration damper according to claim 4 wherein said at least one disc comprises at least two discs disposed in the piston, with at least one of said discs having orifice means for permitting a low velocity flow of the medium through said at least one disc.

6. The vibration damper according to claim 4 wherein said at least one disc comprises at least two valve discs which are located in the piston, said disc being spring washers having different inner diameters and common outer diameters, said common outer diameters disposed to engage one of said engaging means.

7. The vibration damper according to claim 5 wherein said valve discs are supported by a spring element located on a low pressure side of the discs and against one of the means for engaging the discs, said orifice means being operative in a tension mode, when said attachment means are moving away from one another.

8. The vibration damper according to claim 1 including a pretensioning spring element and wherein said valve disc is retained by said pretensioning spring element; on said at least one disc said adjustment device being operable for reducing the pretension.

9. The vibration damper according to claim 5 wherein said valve disc is supported by a spring element located on one side of the disc and against one of the means for engaging the discs, which means for engaging the discs becomes operative in a pressure mode, when said attachment means are moving toward one another.

10. The vibration damper according to claim 1 wherein said at least one disc comprises at least two discs disposed in the piston, with at least one of said discs having orifice means for permitting a low velocity flow of the medium through said at least one disc.

11. The vibration damper according to claim 10 wherein said valve discs are supported by a spring element located on a low pressure side of the discs and against one of the means for engaging the discs, said orifice means being operative in a tension mode when said attachment means are moving away from one another.

12. The vibration damper according to claim 1 wherein said at least one valve disc is supported by a spring element located on one side of said at least one disc and against one of the means for engaging said at least one disc, which engaging means becomes operative in a pressure mode, when said attachment means are moving toward one another.

13. The vibration damper according to claim 1 wherein said at least one disc comprises at least two valve discs which are located in the piston, said discs being spring washers having different inner diameters and common outer diameters, said common outer diameters disposed to engage one of said engaging means.

14. The vibration damper according to claim 1 wherein said at least one disc comprises at least two valve discs which are located in the piston, said valve discs comprise spring washers having different outer diameters and common inner diameters, said common inner diameters engaging one of said engagement means.

15. The vibration damper according to claim 1 in which one of said first and second means, within said piston, for engaging is a component of said adjustment device;
said adjustment device comprising piezo-mechanical means being adjustable in length;
a pretensioning spring element;
a plurality of valve discs being retained in pretension by said pretensioning spring element, with said adjustment means being operable to at least reduce pretension;
at least one of said valve discs being provided with a recess; the valve disc located on one side of said at least one disc being disposed to engage one of said engaging means;
said spring element being located on another side of said valve discs and against one of said engaging means;
said recess being operative in a tension mode wherein said first and second attachment means are separating from one another;
said valve discs being disposed to engage one of the engaging means in said piston, which means becomes operative in a pressure mode wherein said first and second attachment means are approaching one another;
said valve discs being spring washers having at least one of: different inner diameters and common inner diameters;
said outer diameter being at least one of: common outer diameters and different outer diameters; said valve discs disposed to engage one of the engaging means in the piston.

16. The vibration damper of claim 15 in which said valve discs are spring washers having different inner diameters and a common outer diameter and a redisposed to engage on of the engaging means in the piston by a common outer diameter.

17. The vibration damper of claim 15 in which said spring washers have different outer diameters and a common inner diameter disposed; said common inner diameter being to engage one of said engaging means.

* * * * *